United States Patent
Tani et al.

(10) Patent No.: US 12,512,512 B2
(45) Date of Patent: Dec. 30, 2025

(54) POLYMER ELECTROLYTE INCLUDING AMORPHOUS FLUORINE-CONTAINING ELASTOMER AND ALKALI METAL SALT, ELECTROCHEMICAL DEVICE, POLYMER-BASED SOLID-STATE BATTERY, AND ACTUATOR INCLUDING THE SAME

(71) Applicant: DAIKIN INDUSTRIES, LTD., Osaka (JP)

(72) Inventors: Akinori Tani, Osaka (JP); Junpei Terada, Osaka (JP); Takaya Yamada, Osaka (JP); Kae Fujiwara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 534 days.

(21) Appl. No.: 17/922,554

(22) PCT Filed: Apr. 28, 2021

(86) PCT No.: PCT/JP2021/017015
§ 371 (c)(1),
(2) Date: Oct. 31, 2022

(87) PCT Pub. No.: WO2021/221114
PCT Pub. Date: Nov. 4, 2021

(65) Prior Publication Data
US 2023/0178802 A1    Jun. 8, 2023

(30) Foreign Application Priority Data
May 1, 2020    (JP) ................. 2020-081428

(51) Int. Cl.
*H01M 10/0565*    (2010.01)
*C08F 214/22*    (2006.01)
(Continued)

(52) U.S. Cl.
CPC ....... *H01M 10/0565* (2013.01); *C08F 214/22* (2013.01); *C08K 5/43* (2013.01);
(Continued)

(58) Field of Classification Search
CPC .... H01M 10/0565; C08F 214/22; C08K 5/43; C08L 27/16
(Continued)

(56) References Cited

U.S. PATENT DOCUMENTS

2005/0170255 A1    8/2005    Koh et al.
2010/0148635 A1*   6/2010    Kwon ................ C08K 5/55
                                                    310/365
(Continued)

FOREIGN PATENT DOCUMENTS

CN    104380502 A    2/2015
CN    107039680 A    8/2017
(Continued)

OTHER PUBLICATIONS

"Volatile." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1304620. (Year: 2010).*
(Continued)

*Primary Examiner* — Sean P Cullen
(74) *Attorney, Agent, or Firm* — Sughrue Mion, PLLC (57) ABSTRACT

Provided are a composite that can be suitably used as an electrolyte in polymer-based solid-state batteries, and various electrochemical devices using the composite. The composite includes a fluorine-containing elastomer and an alkali metal salt as essential components, wherein the fluorine-containing elastomer is an amorphous fluorine-containing elastomer having a glass transition temperature of 25° C. or
(Continued)

less, and the composite has a volatile content of 0.1 mass % or less with respect to the entire composite.

9 Claims, 1 Drawing Sheet

(51) Int. Cl.
    *C08K 5/43*     (2006.01)
    *C08L 27/16*     (2006.01)
    *H01G 9/025*     (2006.01)
    *H01G 11/56*     (2013.01)
    *H01M 10/0525*     (2010.01)

(52) U.S. Cl.
    CPC ......... *C08L 27/16* (2013.01); *H01M 10/0525* (2013.01); *C08F 2800/10* (2013.01); *H01G 9/025* (2013.01); *H01G 11/56* (2013.01); *H01M 2300/0082* (2013.01)

(58) Field of Classification Search
    USPC .................... 429/188, 300, 303, 316, 323
    See application file for complete search history.

(56) References Cited

U.S. PATENT DOCUMENTS

| | | | |
|---|---|---|---|
| 2015/0096169 | A1 | 4/2015 | Hasegawa et al. |
| 2017/0222244 | A1 | 8/2017 | Kim et al. |
| 2020/0185769 | A1 | 6/2020 | Hamon et al. |
| 2020/0212484 | A1* | 7/2020 | Kwon ..................... C08F 14/18 |
| 2020/0295331 | A1* | 9/2020 | Kai ..................... H01M 50/423 |

FOREIGN PATENT DOCUMENTS

| | | | | |
|---|---|---|---|---|
| CN | 111009686 | A * | 4/2020 | ........ H01M 10/0565 |
| EP | 1 049 108 | A1 | 11/2000 | |
| JP | 11-149825 | A | 6/1999 | |
| JP | 11-242964 | A | 9/1999 | |
| JP | 11-306859 | A | 11/1999 | |
| JP | 2000-195492 | A | 7/2000 | |
| JP | 2001-035534 | A | 2/2001 | |
| JP | 2011-211834 | A | 10/2011 | |
| JP | 2014-078400 | A | 5/2014 | |
| JP | 2015-140400 | A | 8/2015 | |
| JP | 2018-206561 | A | 12/2018 | |
| JP | 2019-513875 | A | 5/2019 | |
| JP | 2019-153545 | A | 9/2019 | |
| WO | 99/28916 | A1 | 6/1999 | |
| WO | 2004/036599 | A1 | 4/2004 | |
| WO | WO-2019054622 | A1 * | 3/2019 | .............. C08F 14/18 |

OTHER PUBLICATIONS

"Actuate." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1219822. (Year: 2010).*
Kayo Arai, et al., "Nonaqueous electrolyte batteries and secondary polymer electrolyte batteries," Chemical Abstracts Service, Database accession No. 1998: 421186, pp. 1-2 (2 pages total).
International Search Report for PCT/JP2021/017015, dated Aug. 3, 2021.
International Preliminary Report on Patentability with translation of Written Opinion dated Oct. 27, 2022 from the International Bureau in International Application No. PCT/JP2021/017015.

* cited by examiner

POLYMER ELECTROLYTE INCLUDING AMORPHOUS FLUORINE-CONTAINING ELASTOMER AND ALKALI METAL SALT, ELECTROCHEMICAL DEVICE, POLYMER-BASED SOLID-STATE BATTERY, AND ACTUATOR INCLUDING THE SAME

CROSS REFERENCE TO RELATED APPLICATIONS

This application is a National Stage of International Application No. PCT/JP2021/017015 filed Apr. 28, 2021, claiming priority based on Japanese Patent Application No. 2020-081428 filed May 1, 2020.

TECHNICAL FIELD

The present disclosure relates to a composite, a polymer electrolyte, an electrochemical device, a polymer-based solid-state battery, and an actuator.

BACKGROUND ART

In recent years, solid-state electrolytes having high ion-conducting property comparable to non-aqueous electrolytic solution have been developed, and the development for practical use of all solid-state batteries has been accelerated.

Patent Document 1 discloses a polymer electrolyte in which a vinylidene copolymer consisting of 35 to 99 mol % of a repeating unit derived from vinylidene fluoride, 1 to 50 mol % of a repeating unit derived from tetrafluoroethylene, and 0 to 20 mol % of a monomer copolymerizable with these and having a melting point of 80° C. or more and a crystallinity of 20 to 80% is impregnated with a non-aqueous electrolyte.

Patent Document 2 discloses a composition comprising a vinylidene fluoride-tetrafluoroethylene copolymer obtained by copolymerizing 1 to 15 mass % of tetrafluoroethylene and an organic solvent capable of dissolving a lithium salt.

Patent Document 3 discloses a polymer solid-state electrolyte that is a rubber-like copolymer of vinylidene fluoride and propylene hexafluoride and comprises an amorphous polymer with a content of the vinylidene fluoride of 55 mol % to 85 mol %, an electrolyte salt, an organic solvent, and an inorganic or organic filler.

RELATED ART

Patent Documents

Patent Document 1: International Publication No. 1999/028916
Patent Document 2: Japanese Patent Laid-Open No. 2001-35534
Patent Document 3: Japanese Patent Laid-Open No. 11-149825

SUMMARY OF THE INVENTION

Problem to be Solved by the Invention

It is an object of the present invention to provide a composite that can be suitably used as an electrolyte, and various electrochemical devices using the aforementioned composite.

Means for Solving the Problem

The present disclosure relates to a composite comprising a fluorine-containing elastomer and an alkali metal salt as essential components, wherein the fluorine-containing elastomer is an amorphous fluorine-containing elastomer having a glass transition temperature of 25° C. or less, and the volatile content is 0.1 mass % or less with respect to the entire composite.

The fluorine-containing elastomer is preferably at least one selected from the group consisting of a vinylidene fluoride-based fluoroelastomer, tetrafluoroethylene/propylene-based fluoroelastomer, and tetrafluoroethylene/perfluoroalkyl vinyl ether-based fluoroelastomer.

The fluorine-containing elastomer is preferably a vinylidene fluoride-based fluoroelastomer.

The fluorine-containing elastomer preferably comprises at least one selected from the group consisting of a tetrafluoroethylene (TFE) unit, a hexafluoropropylene (HFP) unit, a fluorine-containing monomer (1) unit represented by formula (1) below, and a fluorine-containing monomer (2) unit represented by formula (2) below, as a copolymer component:

[Formula 1]

wherein $Rf_1$ represents a linear or branched fluoroalkyl group having 1 to 12 carbon atoms, and $Rf_2$ represents a linear or branched fluoroalkyl group having 1 to 12 carbon atoms.

In the aforementioned composite, it is preferable that the alkali metal salt is at least one lithium salt selected from $LiPF_6$, $LiBF_4$, LiTFSI, LiFSI, $LiPO_2F_2$, and LiBOB, and the content of the alkali metal salt is 0.1 to 90 mass % with respect to the fluorine-containing elastomer.

The composite further comprises: at least one ionic liquid selected from combinations of 1-butyl-3-methyl imidazolium (BMI) cation or N-methyl-N-butyl-pyrrolidium (Pyr14) cation as an organic cation and BF4 anion or bis(trifluoromethanesulfonyl)imide (TFSI) anion as an anion, wherein the content of the ionic liquid is preferably 1.0 to 500 mass % with respect to the fluorine-containing elastomer.

The present disclosure is also a polymer electrolyte consisting of the composite described above.

The present disclosure is also an electrochemical device comprising the polymer electrolyte.

The present disclosure is also a polymer-based solid-state battery comprising the polymer electrolyte.

The polymer-based solid-state battery is preferably a lithium ion secondary battery.

The present disclosure is also an actuator comprising the polymer electrolyte.

Effect of Invention

The composite of the present disclosure can be suitably used as an electrolyte in electrochemical devices such as solid-state secondary batteries since it is a fluoroelastomer-containing composition that is excellent in oxidation resistance, flame retardancy, ion-conducting property, and the like.

DESCRIPTION OF EMBODIMENTS

Hereinafter, the present disclosure will be described in detail.

In recent years, polymer-based solid-state batteries have been developed as a type of solid-state batteries. Such a polymer-based solid-state battery generally comprises a polymer electrolyte consisting of a polymer, an electrolyte, an additive, a plasticizer, an electrolytic solution, and the like, and has an advantage of high safety due to no risk of leakage.

As polymers used for the polymer electrolyte, fluorine-containing polymers have been developed. A fluorine-containing polymer is a component excellent in oxidation resistance, flame retardancy, and the like, and thus has advantages such as being difficult to ignite and being applicable to the roll-to-roll system.

Further, use of a fluorine-containing elastomer that is a kind of fluorine-containing polymers as an electrolyte has been studied. The fluorine-containing elastomer has effects of enhancing the adhesion, the flexibility, and the like, in addition to the performance as a fluorine-containing polymer as described above. It is an object of the present disclosure to develop a composite that has performance as a fluorine-containing elastomer and is excellent in ion-conducting property.

The composite of the present disclosure has high ion-conducting property, excellent oxidation resistance, and excellent flame retardancy together by containing a fluorine-containing elastomer as an essential component and having a volatile content of 0.1 mass % or less. Polymer compositions that have been used as electrolytes for polymer-based solid-state batteries up to now have a volatile content of about 10 mass %, which is higher than that of the composite of the present disclosure. Therefore, there have been disadvantages such as limited operating temperature range and poor long-term reliability.

Further, the polymer solid-state electrolyte disclosed in Patent Document 3 has a fluoroelastomer, an electrolyte salt, an organic solvent, and a filler. However, since Cited Document 3 is an invention in which a fluoroelastomer membrane with solvents volatilized is immersed in an electrolytic solution containing an electrolyte salt and a solvent to swell and then used as an SPE membrane, the volatile content in the entire composite cannot be considered to be 0.1% by mass or less.

The composite of the subject application can be used as an electrolyte while the volatile content is 0.1 mass % or less and is particularly excellent in oxidation resistance and flame retardancy.

Hereinafter, the composite of the present disclosure will be described in detail.

The present disclosure is a composite comprising a fluorine-containing elastomer and an alkali metal salt as essential components.

It is preferable that the fluorine-containing elastomer is an amorphous or low-crystalline fluorine-containing polymer having a low glass transition temperature.

The glass transition temperature of the fluorine-containing elastomer is 25° C. or less. More preferably, the glass transition temperature is 0° C. or less. The glass transition temperature is further preferably −5° C. or less, most preferably −10° C. or less. Further, it also can be −20° C. or less. Here, 10 mg of a sample is heated at 20° C./minute after cooling to −75° C. using a differential scanning calorimeter (X-DSC823e, available from Hitachi High-Tech Science Corporation) to obtain a DSC curve, and the temperature at the intersection of the tangent between extended lines of the base lines before and after the secondary transfer in the DSC curve and the inflection point in the DSC curve is taken as a glass transition temperature.

Being amorphous means that there is no melting point peak in the DSC curve described above.

The fluorine-containing elastomer of the present disclosure is not limited, as long as it satisfies the aforementioned requirements, and examples thereof include a vinylidene fluoride (VdF)-based fluoroelastomer, a tetrafluoroethylene (TFE)/propylene (Pr)-based fluoroelastomer, a tetrafluoroethylene (TFE)/perfluoroalkyl vinyl ether-based fluoroelastomer, a tetrafluoroethylene (TFE)/propylene (Pr)/vinylidene fluoride (VdF)-based fluoroelastomer, an ethylene (Et)/hexafluoropropylene (HFP)-based fluoroelastomer, an ethylene (Et)/hexafluoropropylene (HFP)/vinylidene fluoride (VdF)-based fluoroelastomer, an ethylene (Et)/hexafluoropropylene (HFP)/tetrafluoroethylene (TFE)-based fluoroelastomer, a fluorosilicone-based fluoroelastomer, or a fluorophosphazene-based fluoroelastomer. They may be used alone, or in any combination, as long as the effects of the present disclosure are not impaired. Among these, a VdF-based fluoroelastomer, a TFE/Pr-based fluoroelastomer, and a TFE/perfluoroalkyl vinyl ether-based fluoroelastomer are more suitable, and a VdF-based fluoroelastomer is particularly preferably used.

In the VdF-based fluoroelastomer, the VdF unit is preferably 20 mol % or more and 90 mol % or less, more preferably 40 mol % or more and 85 mol % or less, with respect to the total of the number of moles of the VdF unit and units derived from other monomers. The lower limit is further preferably 45 mol %, particularly preferably 50 mol %. The upper limit is further preferably 80 mol %.

In the present disclosure, the VdF-based fluoroelastomer preferably further comprises at least one selected from the group consisting of a tetrafluoroethylene (TFE) unit, a hexafluoropropylene (HFP) unit, a fluorine-containing monomer (1) unit represented by formula (1) below, and a fluorine-containing monomer (2) unit represented by formula (2) below, as a copolymer component:

[Formula 2]

(1)

(2)

wherein $Rf_1$ represents a linear or branched fluoroalkyl group having 1 to 12 carbon atoms, and $Rf_2$ represents a linear or branched fluoroalkyl group having 1 to 12 carbon atoms.

The fluorine-containing monomer (1) represented by formula (1) is preferably a monomer in which $Rf_1$ is a linear fluoroalkyl group, more preferably a linear perfluoroalkyl group. $Rf_1$ preferably has 1 to 6 carbon atoms. Examples of the fluorine-containing monomer represented by formula (1) include $CH_2$=$CFCF_3$, $CH_2$=$CFCF_2CF_3$, $CH_2$=$CFCF_2CF_2CF_3$, and $CH_2$=$CFCF_2CF_2CF_2CF_3$. Among these, 2,3,3,3-tetrafluoropropene represented by $CH_2$=$CFCF_3$ is preferable.

The fluorine-containing monomer (2) represented by formula (2) is preferably a monomer in which $Rf_2$ is a linear fluoroalkyl group, more preferably a linear perfluoroalkyl group. $Rf_2$ preferably has 1 to 6 carbon atoms. Examples of the fluorine-containing monomer (2) represented by formula (2) include $CHF$=$CHCF_3$, $CHF$=$CHCF_2CF_3$, $CHF$=$CHCF_2CF_2CF_3$, and $CHF$=$CHCF_2CF_2CF_2CF_3$. Among these, 1,3,3,3-tetrafluoropropylene represented by $CHF$=$CHCF_3$ is preferable.

Further, repeating units derived from comonomers other than the TFE unit, the HFP unit, the fluorine-containing monomer (1) unit, and the fluorine-containing monomer (2) unit may be contained.

The other comonomers are not limited, as long as they are copolymerizable with each monomer as described above. Examples thereof include fluorine-containing monomers such as perfluoroalkyl vinyl ether (PAVE), chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, and iodine-containing fluorinated vinyl ether; fluorine-free monomers such as ethylene (Et), propylene (Pr), and alkyl vinyl ether, a monomer imparting a crosslinkable group (cure site), and a reactive emulsifier. These monomers and compounds can be used singly or in combination of two or more.

The PAVE is more preferably perfluoro(methyl vinyl ether) (PMVE) or perfluoro (propyl vinyl ether) (PPVE), particularly preferably PMVE.

Further, the PAVE that can be used may be perfluorovinyl ether represented by formula:

$$CF_2=CFOCF_2ORf^c$$

wherein $Rf^c$ is a linear or branched perfluoroalkyl group having 1 to 6 carbon atoms, a cyclic perfluoroalkyl group having 5 to 6 carbon atoms, or a linear or branched perfluorooxyalkyl group having 1 to 3 oxygen atoms and 2 to 6 carbon atoms. For example, $CF_2$=$CFOCF_2OCF_3$, $CF_2$=$CFOCF_2OCF_2CF_3$, or $CF_2$=$CFOCF_2OCF_2CF_2OCF_3$ is preferably used.

The VdF-based fluoroelastomer is preferably at least one copolymer selected from the group consisting of a VdF/HFP copolymer, a VdF/TFE/HFP copolymer, a VdF/CTFE/TFE copolymer, a VdF/TFE/PAVE copolymer, VdF/HFP/PAVE copolymer, a VdF/HFP/TFE/PAVE copolymer, a VdF/TFE/Pr copolymer, a VdF/Et/HFP copolymer, a VdF/Et/HFP/TFE/PAVE copolymer, a VdF/TFP/TFE copolymer, and a VdF/TFP copolymer.

Among these, at least one copolymer selected from the group consisting of a VdF/HFP copolymer, a VdF/TFE/HFP copolymer, a VdF/TFP copolymer, a VdF/TFE/PAVE copolymer, a VdF/HFP/PAVE copolymer, a VdF/HFP/TFE/PAVE copolymer, and a VdF/TFP/TFE copolymer is preferable, and at least one copolymer selected from the group consisting of a VdF/HFP copolymer, a VdF/TFE/HFP copolymer, a VdF/TFE/PAVE copolymer, and a VdF/TFP copolymer is more preferable.

The VdF/HFP copolymer preferably has a VdF/HFP composition of (45 to 85)/(55 to 15) (mol %), more preferably (50 to 80)/(50 to 20) (mol %), further preferably (60 to 80)/(40 to 20) (mol %).

It is also preferable that the VdF/HFP composition is (50 to 78)/(50 to 22) (mol %).

The VdF/TFE/HFP copolymer preferably has a VdF/TFE/HFP composition of (30 to 80)/(4 to 35)/(10 to 35) (mol %).

The VdF/TFE/PAVE copolymer preferably has a VdF/TFE/PAVE composition of (40 to 80)/(3 to 40)/(15 to 35) (mol %).

The VdF/HFP/PAVE copolymer preferably has a VdF/HFP/PAVE composition of (65 to 90)/(3 to 25)/(3 to 25) (mol %).

The VdF/HFP/TFE/PAVE copolymer preferably has a VdF/HFP/TFE/PAVE composition of (40 to 90)/(0 to 25)/(0 to 40)/(3 to 35) (mol %), more preferably (40 to 80)/(3 to 25)/(3 to 40)/(3 to 25) (mol %).

Examples of the PAVE above include PMVE and PPVE. These may be used alone, or in any combination.

The VdF/TFP copolymer preferably comprises 85/15 to 20/80 (mol %) of the VdF/TFP unit and 0 to 50 mol % of the monomer units other than VdF and TFP, with respect to all monomer units, more preferably 80/20 to 20/80 of the VdF/TFP unit. According to one of preferable embodiments, the VdF/TFP composition is 78/22 to 50/50 (mol %).

The VdF/TFP preferably makes 85/15 to 50/50 (mol %), and the monomer units other than VdF and TFP preferably account for 1 to 50 mol %, with respect to all monomer units. The monomers other than VdF and TFP are preferably the monomers mentioned as examples of the comonomers of VdF such as TFE, HFP, PMVE, perfluoroethyl vinyl ether (PEVE), PPVE, CTFE, trifluoroethylene, hexafluoroisobutene, vinyl fluoride, Et, Pr, alkyl vinyl ether, a monomer imparting a crosslinkable group, and a reactive emulsifier. Among these PMVE, CTFE, HFP, and TFE are more preferable.

The VdF/TFP/TFE copolymer preferably has a VdF/TFP/TFE composition of (85 to 75)/(23 to 13)/(0.1 to 6) (mol %).

In the present disclosure, the compositional features of the fluorine-containing elastomer can be measured, for example, by $^{19}F$-NMR measurement.

The fluorine-containing elastomer preferably has a number-average molecular weight (Mn) of 7,000 to 5,000,000, a mass-average molecular weight (Mw) of 10,000 to 10,000,000, and Mw/Mn of 1.0 to 30.0, further preferably 1.5 to 25.0, for improving the adhesion, the flexibility, and the solubility in a solvent. The number-average molecular weight (Mn), the mass-average molecular weight (Mw), and the Mw/Mn are values measured by the GPC method.

The fluorine-containing elastomer preferably has a Mooney viscosity at 100° C. (ML1+10 (100° C.)) of 2 or more, more preferably 5 or more. Further, it is preferably 200 or less, more preferably 150 or less, further preferably 100 or less, for good formability. The Mooney viscosity is a value measured according to ASTM-D1646 and JIS K6300.

The fluorine-containing elastomer can be produced by a common radical polymerization method. The polymerization form may be any of bulk polymerization, solution polymerization, suspension polymerization, and emulsion polymerization, but emulsion polymerization is preferable since it is industrially easy to implement.

In polymerization, a polymerization initiator, a chain transfer agent, a surfactant, and a solvent can be used, and those conventionally known can be used for each. In polymerization of the copolymer, the polymerization initiator that can be used may be an oil-soluble radical polymerization initiator or a water-soluble radical initiator.

The amount of the radical polymerization initiator to be added is not limited, but it may be added in an amount in which the polymerization rate does not significantly decrease (for example, several ppm to the water concentration) or more all at once at the beginning of the polymerization, sequentially, or continuously. The upper limit is a range in which the heat of the polymerization reaction can be removed from the surface of the apparatus.

The surfactant that can be used may be a conventionally known surfactant such as a nonionic surfactant, an anionic surfactant, and a cationic surfactant. The amount to be added (to polymerization water) is preferably 10 to 5,000 ppm. It is more preferably 50 to 5,000 ppm.

The solvent that can be used is preferably a solvent having no chain transfer property. In the case of solution polymerization, examples thereof include dichloropentafluoropropane (R-225). In the case of emulsion polymerization and suspension polymerization, examples thereof include water, a mixture of water and a water-soluble organic solvent, or a mixture of water and a water-insoluble organic solvent.

In the polymerization, examples of the chain transfer agent include isopentane, methane, ethane, propane, isopropanol, acetone, various mercaptans, carbon tetrachloride, and cyclohexane, in addition to esters such as dimethyl malonate, diethyl malonate, methyl acetate, ethyl acetate, butyl acetate, and dimethyl succinate.

The chain transfer agent to be used may be a bromine compound or an iodine compound. Examples of the polymerization method using the bromine compound or the iodine compound include a method of performing emulsion polymerization in a water medium while applying a pressure in the presence of the bromine compound or the iodine compound in a substantially anoxic state (iodine transfer polymerization method). Typical examples of the bromine compound or the iodine compound to be used include a compound represented by formula:

wherein x and y each are an integer of 0 to 2, and $1 \leq x+y \leq 2$ is satisfied, and $R^2$ is a saturated or unsaturated fluorohydrocarbon group or a chlorofluorohydrocarbon group having 1 to 16 carbon atoms, or a hydrocarbon group having 1 to 3 carbon atoms and optionally containing an oxygen atom. Use of the bromine compound or the iodine compound allows iodine or bromine to be introduced into the polymer to function as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo iodoperfluorobutane, 3-bromo-4-iodoperfluorobutene-1,2-bromo-4-iodoperfluorobutene-1, a monoiodomonobromo substitute of benzene, a diiodomonobromo substitute, and (2-iodoethyl) and (2-bromoethyl) substitutes. These compounds may be used alone, or in combination with each other.

Among these, 1,4-diiodoperfluorobutane, 1,6-diiodoperfluorohexane, and 2-iodoperfluoropropane are preferably used, in view of the polymerization reactivity, the crosslinking reactivity, and the availability.

The fluorine-containing elastomer may be in any form such as an aqueous dispersion or powder. In the case of emulsion polymerization, the fluorine-containing elastomer powder can be obtained by coagulating the dispersion as polymerized, followed by washing with water, dehydrating, and drying. Coagulation can be performed by adding an inorganic salt such as aluminum sulfate or an inorganic acid, applying a mechanical shearing force, or freezing the dispersion. In the case of suspension polymerization, it can be obtained by recovering a suspension from the dispersion as polymerized, followed by drying. In the case of solution polymerization, it can be obtained by drying the solution containing the fluorine-containing polymer as it is, or by adding a poor solvent dropwise for purification.

The fluorine-containing elastomers may be used alone, or in combination of two or more. In particular, two types of copolymers having different molecular structures may be used in combination in some embodiments. Examples of the embodiments in which two types of copolymers having different molecular structures are used in combination include an embodiment using two copolymers (I) having different molecular structures, an embodiment using two copolymers (II) having different molecular structures, and an embodiment using one copolymer (I) and one copolymer (II) in combination.

The fluorine-containing elastomer of the present disclosure that can be used may be a commercially available fluorine-containing elastomer. Examples of the commercially available fluorine-containing elastomer that can be used can include Daiel, available from DAIKIN INDUSTRIES, LTD.

(Alkali Metal Salt)

The composite of the present disclosure comprises an alkali metal salt.

The alkali metal salt can be expressed as MX, wherein M represents an alkali metal, and X represents a substance serving as a counter anion. The alkali metal salt may be used alone, or two or more of them may be used in the form of a mixture.

The alkali metal salt is particularly preferably a lithium salt (that is, a compound represented by LiX).

Any lithium salt can be used, and specific examples are as follows. For example, inorganic lithium salts such as $LiPF_6$, $LiBF_4$, $LiClO_4$, $LiAlF_4$, $LiSbF_6$, $LiTaF_6$, $LiWF_7$, $LiAsF_6$, $LiAlCl_4$, LiI, LiBr, LiCl, $LiB_{10}Cl_{10}$, $Li_2SiF_6$, $Li_2PFO_3$, and $LiPO_2F_2$; lithium tungstates such as $LiWOF_5$; lithium carboxylates such as $HCO_2Li$, $CH_3CO_2Li$, $CH_2F_2CO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium salts having an S=O group such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$, lithium methyl sulfate, lithium ethyl sulfate($C_2H_5OSO_3Li$), and lithium 2,2,2-trifluoroethyl sulfate; lithium imide salts such as LiTFSI, LiFSI, $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium bisperfluoroethanesulfonylimide, lithium cyclic 1,2-perfluoroethanedisulfonylimide, lithium cyclic 1,3-perfluoropropanedisulfonylimide, lithium cyclic 1,2-ethanedisulfonylimide, lithium cyclic 1,3-propanedisulfonylimide, lithium cyclic 1,4-perfluorobutanedisulfonylimide, LiN($CF_3SO_2$)($FSO_2$), LiN($CF_3SO_2$)$_2$($C_3F_7SO_2$), LiN($CF_3SO_2$)($C_4F_9SO_2$) and LiN($POF_2$)$_2$; lithium methide salts such as LiC($FSO_2$)$_3$, LiC($CF_3SO_2$)$_3$, and LiC($C_2F_5SO_2$)$_3$; other fluorine-containing organic lithium salts such as a salt represented by formula: $LiPF_a(C_nF_{2n+1})_{6-a}$, wherein a is an integer of 0 to 5, and n is an integer of 1 to 6, (for example, LiPF$_3$($C_2F_5$)$_3$, LiPF$_3$($CF_3$)$_3$, LiPF$_3$(iso-$C_3F_7$)$_3$, LiPF$_5$ (iso-$C_3F_7$), LiPF$_4$($CF_3$)$_2$, LiPF$_4$ ($C_2F_5$)$_2$), LiPF$_4$ ($CF_3SO_2$)$_2$, LiPF$_4$ ($C_2F_5SO_2$)$_2$, LiBF$_3$CF$_3$, LiBF$_3$C$_2$F$_5$, LiBF$_3$C$_3$F$_7$, LiBF$_2$(CF$_3$)$_2$, LiBF$_2$(C$_2$F$_5$)$_2$, LiBF$_2$(CF$_3$SO$_2$)$_2$, and LiBF$_2$(C$_2$F$_5$SO$_2$)$_2$; LiBOB, LiTDI, LiSCN, LiB(CN)$_4$, LiB(C$_6$H$_5$)$_4$, Li$_2$(C$_2$O$_4$), LiP(C$_2$O$_4$)$_3$, Li$_2$B$_{12}$F$_b$H$_{12-b}$ (b is an integer of 0 to 3), and the like, can be mentioned.

Among them, LiPF$_6$, LiBF$_4$, LiSbF$_6$, LiTaF$_6$, LiPO$_2$F$_2$, FSO$_3$Li, CF$_3$SO$_3$Li, LiN(FSO$_2$)$_2$, LiN(FSO$_2$)(CF$_3$SO$_2$), LiN(CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, LiC(FSO$_2$)$_3$, LiC(CF$_3$SO$_2$)$_3$, LiC(C$_2$F$_5$SO$_2$)$_3$, LiBF$_3$CF$_3$, LiBF$_3$C$_2$F$_5$, LiPF$_3$(CF$_3$)$_3$, LiPF$_3$(C$_2$F$_5$)$_3$, LiTFSI, LiFSI, LiBOB, LiTDI, and the like, are particularly preferable due to their effects of improving the output characteristics, the high rate charge/discharge characteristics, the high-temperature storage characteristics, the cycle characteristics, and the like, and at least one lithium salt selected from the group consisting of LiPF$_6$, LiBF$_4$, LiTFSI, LiFSI, LiPO$_2$F$_2$, and LiBOB is most preferable.

These electrolyte salts may be used alone, or in combination of two or more. Preferable examples in the case of using two or more in combination include a combination of LiPF$_6$ and LiBF$_4$, which has effects of improving the high-temperature storage characteristics, the load characteristic, and the cycle characteristics.

In the composite of the present disclosure, the amount of the alkali metal salt to be mixed is preferably 0.1 mass % or more, more preferably 1.0 mass % or more, with respect to the fluorine-containing elastomer. Further, the amount is preferably 90 mass % or less, more preferably 80 mass % or less, further preferably 70 mass % or less.

Further, another example is a combination of an inorganic lithium salt and an organic lithium salt, and the combination of these two has an effect of suppressing the deterioration due to high-temperature storage. Preferable examples of the organic lithium salt include CF$_3$SO$_3$Li, LiN(FSO$_2$)$_2$, LiN(FSO$_2$)(CF$_3$SO$_2$), LiN(CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, LiC(FSO$_2$)$_3$, LiC(CF$_3$SO$_2$)$_3$, LiC(C$_2$F$_5$SO$_2$)$_3$, LiBF$_3$CF$_3$, LiBF$_3$C$_2$F$_5$, LiPF$_3$(CF$_3$)$_3$, and LiPF$_3$(C$_2$F$_5$)$_3$. In such a case, the proportion of the organic lithium salt is preferably 0.1 mass % or more, particularly preferably 0.5 mass % or more, and preferably 30 mass % or less, particularly preferably 20 mass % or less, with respect to 100 mass % of the entire composite.

The concentration of such an alkali metal salt in the composite is not limited as long as the effects of the present disclosure are not impaired. For achieving the electric conductivity of the composite falling within a good range and ensuring good battery performance, the total molar concentration of lithium in the composite is preferably 0.3 mol/L or more, more preferably 0.4 mol/L or more, further preferably 0.5 mol/L or more, and preferably 5.0 mol/L or less, more preferably 4.5 mol/L or less, further preferably 4.0 mol/L or less.

When the total molar concentration of lithium is excessively low, the electric conductivity of the composite may be insufficient, whereas when the concentration is excessively high, the electrical conductivity may decrease due to an increase in viscosity, which may result in a decrease in battery performance.

(Ionic Liquid)

The composite of the present disclosure may further comprise an ionic liquid.

The "ionic liquid" is a liquid consisting of ions combining organic cations with anions. Containing the ionic liquid can increase the ion conductivity. Negligible vapor pressure and non-flammability are also desirable features.

Examples of the organic cations include, but are not limited to, imidazolium ions such as dialkyl imidazolium cation and trialkyl imidazolium cation; tetraalkylammonium ions; alkylpyridinium ions; dialkylpyrrolidinium ions; and dialkylpiperidinium ions.

Examples of the counter anions of these organic cations include, but are not limited to, PF$_6$ anion, PF$_3$(C$_2$F$_5$)$_3$ anion, PF$_3$(CF$_3$)$_3$ anion, BF$_4$ anion, BF$_2$(CF$_3$)$_2$ anion, BF$_3$(CF$_3$) anion, bisoxalato borate anion, P(C$_2$O$_4$)F$_2$ anion, Tf (trifluoromethanesulfonyl) anion, Nf (nonafluorobutanesulfonyl) anion, bis(fluorosulfonyl)imide anion, bis(trifluoromethanesulfonyl)imide (TFSI) anion, bis(pentafluoroethanesulfonyl)imide anion, dicyanoamine anion, and halide anion.

The ionic liquid is preferably at least one selected from combinations of 1-butyl-3-methyl imidazolium (BMI) cation or N-methyl-N-butyl-pyrrolidium (Pyr14) cation, as an organic cation, and BF$_4$ anion, or bis(trifluoromethanesulfonyl)imide (TFSI) anion, as an anion.

Among these, TFSI is particularly preferable.

The content of the ionic liquid is preferably 1.0 to 500 mass % with respect to the fluorine-containing elastomer. The lower limit is more preferably 10 mass %, and the upper limit is more preferably 300 mass %.

(Other Additives)

For improving the electric conductivity, metal fillers such as TiO$_2$ and Al$_2$O$_3$ may be added as other additives. The content of the additives is preferably 0.1 to 10 mass % with respect to the fluorine-containing elastomer. It is more preferably 0.2 to 5 mass %.

The composite of the present disclosure contains 0.1 mass % or less of volatile components with respect to the entire composite. Containing such an extremely low amount of volatile components gives an advantage of long-term reliability.

The composite of the present disclosure is preferably flame retardant. The flame retardant property is particularly preferable since it allows safe use in various electrochemical devices.

Flame retardant" means that the evaluation result of "No flame transferred from naked flame" is obtained in the evaluation of flame retardancy in Examples, which will be described later in detail.

Setting the volatile content to 0.1 mass % or less gives excellent oxidation resistance, excellent flame retardancy, excellent heat resistance, and excellent film-forming property, as well as high ion-conducting property. Polymer compositions that have been used as electrolytes for polymer-based solid-state batteries up to now have a volatile content of about 10 mass %, which is higher than that of the composite of the present disclosure. Therefore, there have been disadvantages such as limited operating temperature range and poor long-term reliability.

The method for adjusting the volatile content in the composite within such a range is not limited, and examples thereof can include a method of heating the composite film obtained as a thin film under reduced pressure, followed by drying.

The volatile content in the present disclosure is a value determined by the later-described method in Examples.

(Production Method)

The method for producing the composite is not limited, and any method can be used for preparation. For example, it can be obtained by dispersing the fluorine-containing elastomer, an alkali metal salt, and an ionic liquid, and an additive and the like, as required, in a solvent, and applying the dispersion obtained into a thin film.

The type of the solvent for forming such a dispersion is not limited, as long as it is a solvent capable of dissolving or dispersing the components. Any of aqueous solvents and organic solvents may be used. Examples of the aqueous solvents include water and a mixed solvent of an alcohol and water. Examples of the organic solvents include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropyl amine; ethers such as diethyl ether, propylene oxide, and tetrahydrofuran (THF); amides such as N-methylpyrrolidone (NMP), dimethylformamide, and dimethylacetamide; and polar aprotic solvents such as hexamethylphosphamide and dimethylsulfoxide.

Further, it is also possible to produce the dispersion by kneading the fluorine-containing elastomer, an alkali metal salt, and an ionic liquid, and an additive and the like as required, without a solvent and then forming the mixture.

(Electrochemical Device)

The composite of the present disclosure can be suitably used as an electrolyte for various electrochemical devices. An electrochemical device including a polymer electrolyte consisting of the composite is also one aspect of the present disclosure.

The electrochemical device is not limited and can be one of conventionally known electrochemical devices. Specifically, secondary batteries such as lithium ion batteries, primary batteries such as lithium batteries, sodium ion batteries, magnesium ion batteries, radical batteries, solar cells (especially dye-sensitized solar cells), fuel cells; capacitors such as lithium ion capacitors, hybrid capacitors, electrochemical capacitors, and electric double-layer capacitors; actuators such as cylinders, swing motors, and motors; various condensers such as aluminum electrolytic condensers and tantalum electrolytic condensers; and electronic elements, electrochemical switching elements, various electrochemical sensors, and the like, can be mentioned.

Among these, since it has a high capacity and a large output, the composite can be suitably used for secondary batteries that undergo a large volume change due to movement of a large amount of metal ions.

(Secondary Solid-State Battery)

The present disclosure is also a secondary solid-state battery comprising the composite of the present disclosure as a polymer electrolyte.

The secondary solid-state battery of the present disclosure is a polymer-based solid-state battery comprising: a positive electrode and a negative electrode, each consisting of a positive electrode active material or a negative electrode active material, a binder, and a current collector; and a polymer electrolyte layer consisting of the composite interposed between the positive electrode and the negative electrode. The secondary solid-state battery is preferably a lithium ion battery.

The positive electrode active material and the negative electrode active material are not limited, and examples thereof can include those used for known electrochemical devices such as secondary batteries including lead batteries, nickel-cadmium batteries, nickel-hydrogen batteries, lithium ion batteries, and alkali metal sulfur batteries, and electric double-layer capacitors.

(Positive Electrode)

The positive electrode active material is not limited, and examples thereof can include those used for known electrochemical devices. Specifically, the positive electrode active material of a lithium ion secondary battery is not limited, as long as it is capable of electrochemically absorbing/desorbing lithium ions. Examples thereof include a lithium-containing transition metal composite oxide, a lithium-containing transition metal phosphate compound, a sulfur material, and an electrically conductive polymer. Among these, the positive electrode active material is preferably a lithium-containing transition metal composite oxide or a lithium-containing transition metal phosphate compound, and a lithium-containing transition metal composite oxide that produces a high voltage is particularly preferable.

The transition metal of the lithium-containing transition metal composite oxide is preferably V, Ti, Cr, Mn, Fe, Co, Ni, Cu, or the like. Specific examples of the lithium-transition metal composite oxide include a lithium-cobalt composite oxide such as $LiCoO_2$, a lithium-nickel composite oxide such as $LiNiO_2$, a lithium-manganese composite oxide such as $LiMnO_2$, $LiMn_2O_4$, and $Li_2MnO_3$, and those with some of the transition metal atoms that are main components of these lithium-transition metal composite oxides substituted by other metals such as Al, Ti, V, Cr, Mn, Fe, Co, Li, Ni, Cu, Zn, Mg, Ga, Zr, and Si. Examples of those substituted include a lithium-nickel-manganese composite oxide, a lithium-nickel-cobalt-aluminum composite oxide, a lithium-nickel-cobalt-manganese composite oxide, a lithium-manganese-aluminum composite oxide, and a lithium-titanium composite oxide. More specifically, examples thereof include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

The transition metal of a lithium-containing transition metal phosphate compound is preferably V, Ti, Cr, Mn, Fe, Co, Ni, Cu, or the like. Specific examples of the lithium-containing transition metal phosphate compound include iron phosphates such as $LiFePO_4$, $Li_3Fe_2(PO_4)_3$, and $LiFeP_2O_7$, cobalt phosphates such as $LiCoPO_4$, and those with some of the transition metal atoms that are main components of these lithium transition metal phosphate compounds substituted by other metals such as Al, Ti, V, Cr, Mn, Fe, Co, Li, Ni, Cu, Zn, Mg, Ga, Zr, Nb, and Si.

In particular, for high voltage, high energy density, or charge/discharge cycle characteristics, $LiCoO_2$, $LiNiO_2$, $LiMn_2O_4$, $LiNi_{0.82}Co_{0.15}Al_{0.03}O_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiFePO_4$ are preferable.

Examples of the sulfur material can include a material containing a sulfur atom. At least one selected from the group consisting of elemental sulfur, a metal sulfide, and an organic sulfur compound is preferable, and elemental sulfur is more preferable. The metal sulfide may be a metal polysulfide. The organic sulfur compound may be an organic polysulfide.

Examples of the metal sulfide include a compound represented by $LiS_x$ ($0<x\leq 8$); a compound represented by $Li_2S_x$ ($0<x\leq 8$); a compound with a two-dimensional layered structure such as $TiS_2$ and $MoS_2$; and a Chevrel compound with a strong three-dimensional skeletal structure represented by $Me_xMo_6S_8$, wherein Me is one of various transition metals typified by Pb, Ag, and Cu.

Examples of the organic sulfur compound include a carbon sulfide compound.

The organic sulfur compound may be used as a carbon composite material while being carried by a material having pores such as carbon. The content of sulfur in the carbon composite material is preferably 10 to 99 mass %, more preferably 20 mass % or more, further preferably 30 mass % or more, particularly preferably 40 mass % or more, and preferably 85 mass % or less, with respect to the carbon composite material, for further excellent cycle performance and further reduced overvoltage.

In the case where the positive electrode active material is the elemental sulfur, the content of sulfur in the positive electrode active material is equal to the content of the elemental sulfur.

Examples of the electrically conductive polymer include a p-doped electrically conductive polymer and an n-doped electrically conductive polymer. Examples of the electrically conductive polymer include a polyacetylene polymer, a polyphenylene polymer, a heterocyclic polymer, an ionic polymer, and a ladder or network polymer.

In the present disclosure, these positive electrode active materials may be used alone, or two or more of them having different compositional features or different powder physical properties may be used in any combination at any ratio.

The positive electrode preferably further contains a binder, a thickener, a conductive additive, and the like.

Any material can be used as the binder, as long as it is a safe material for the solvent and the electrolytic solution used in production of the electrode. Examples thereof include polyvinylidene fluoride, polytetrafluoroethylene, polyethylene, polypropylene, SBR (styrene-butadiene rubber), isoprene elastomer, butadiene elastomer, ethylene-acrylic acid copolymer, ethylene-methacrylic acid copolymer, polyethylene terephthalate, polymethyl methacrylate, polyimide, aromatic polyamide, cellulose, nitro cellulose, NBR (acrylonitrile-butadiene rubber), fluoroelastomer, ethylene-propylene elastomer, styrene-butadiene-styrene block copolymer or a hydrogenated product thereof, EPDM (ethylene-propylene-diene ternary copolymer), styrene-ethylene-butadiene-ethylene copolymer, styrene-isoprene-styrene block copolymer or a hydrogenated product thereof, syndiotactic-1,2-polybutadiene, polyvinyl acetate, ethylene-vinyl acetate copolymer, propylene-α-olefin copolymer, polyvinylidene fluoride, vinylidene fluoride-tetrafluoroethylene copolymer, tetrafluoroethylene-ethylene copolymer, and a polymer composition having an ion-conducting property of alkali metal ions (especially lithium ions). These substances may be used alone, or in any combination of two or more at any ratio.

The content of the binder is generally 0.1 mass % or more, preferably 1 mass % or more, further preferably 1.5 mass % or more, and generally 80 mass % or less, preferably 60 mass % or less, further preferably 40 mass % or less, most preferably 10 mass % or less, as a proportion of the binder in the positive electrode active material layer. When the proportion of the binder is excessively low, the positive electrode active material cannot be sufficiently held, and the mechanical strength of the positive electrode becomes insufficient, which may result in deterioration of battery performance such as cycle characteristics. Meanwhile, an excessively high proportion may lead to a decrease in battery capacity and electric conductivity.

Examples of the thickener include carboxymethylcellulose, methylcellulose, hydroxymethylcellulose, ethylcellulose, polyvinyl alcohol, oxidized starch, phosphorylated starch, casein, and the salts of these. They may be used alone, or in any combination of two or more at any ratio.

The proportion of the thickener with respect to the positive electrode active material is generally 0.1 mass % or more, preferably 0.2 mass % or more, more preferably 0.3 mass % or more, and generally 5 mass % or less, preferably 3 mass % or less, more preferably 2 mass % or less. When it falls below such a range, the coating properties may considerably decrease. When it exceeds such a range, the proportion of the active material in the positive electrode active material layer decreases, which may result in a problem of the decrease in battery capacity or a problem of an increase in the resistance between positive electrode active materials.

The conductive additive is not limited, as long as it can improve the electric conductivity of the electrolyte, but examples thereof can include carbon blacks such as acetylene black and KETJENBLACK; carbon fibers such as a multi-walled carbon nanotube, a single-walled carbon nanotube, carbon nanofibers, graphene, and vapor grown carbon fibers (VGCF); and metal powders such as SUS powder and aluminum powder.

(Negative Electrode)

The negative electrode is constituted by a negative electrode active material layer containing a negative electrode active material and a current collector. The negative electrode active material is not limited, and those used in known electrochemical devices can be mentioned. Specifically, the negative electrode active material of a lithium ion secondary battery is not limited, as long as it is capable of electrochemically absorbing/desorbing lithium ions. Specific examples include a carbonaceous material, an alloy material, a lithium-containing metal composite oxide material, and an electrically conductive polymer. These may be used alone, or in any combination of two or more.

The carbonaceous material capable of absorbing/desorbing lithium is preferably artificial graphite, which is produced by high-temperature treatment of graphitizable pitches obtained from various raw materials, or purified natural graphite, or those obtained by surface treatment of such graphite with pitches or other organic substances followed by carbonization. One selected from natural graphite, artificial graphite, an artificial carbonaceous substance, and a carbonaceous material obtained by heat-treating an artificial graphite substance in the range of 400 to 3,200° C. once or more, a carbonaceous material in which the negative electrode active material layer consists of at least two or more carbonaceous matters having different crystallinities and/or has an interface where the carbonaceous matters having different crystallinities are in contact, and a carbonaceous material in which the negative electrode active material layer has an interface where at least two or more carbonaceous matters having different orientation properties are in contact is more preferable, for good balance between the initial irreversible capacity and the charge/discharge characteristics at high-current density. These carbon materials may be used alone, or in any combination of two or more at any ratio.

Examples of the carbonaceous material obtained by heat-treating the artificial carbonaceous substance and the artificial graphite substance in the range of 400 to 3,200° C. once or more include pyrolysis products of organic substances such as a carbon nanotube, graphene, coal coke, petroleum coke, coal pitch, petroleum pitch and those obtained by oxidizing these pitches, needle coke, pitch coke and a carbon agent obtained by partially graphitizing these, furnace black, acetylene black, and pitch carbon fibers, carbonizable organic substances and carbides thereof, or solutions of carbonizable organic substances dissolved in low-molecular weight organic solvents such as benzene, toluene, xylene, quinoline, and n-hexane and carbides thereof.

The metal material (however, excluding lithium titanium composite oxides) used as the negative electrode active material is not limited, as long as it is capable of absorbing/desorbing lithium, and may be any of single lithium, a single metal and alloy forming a lithium alloy, or a compound such as oxide, carbide, nitride, silicide, sulfide, or phosphide thereof. The single metal and alloy forming a lithium alloy is preferably a material containing group 13 and group 14 metal/metalloid elements, more preferably a single metal such as aluminum, silicon, and tin (hereinafter abbreviated to as "specific metal elements") and alloy or a compound containing these atoms. These may be used alone, or in any combination of two or more at any ratio.

Examples of the negative electrode active material having at least one atom selected from the specific metal elements include any one metal alone of the specific metal elements, an alloy consisting of two or more specific metal elements, an alloy consisting of one or more specific metal elements and another or more metal elements, and a compound containing one or more specific metal elements, and a composite compound such as oxide, carbide, nitride, silicide, sulfide, or phosphide of the compound. Use of such a metal alone, alloy, or metal compound as the negative electrode active material can increase the capacity of the battery.

Any one of conventionally known metal particles that can be alloyed with Li can be used, but the metal particles are preferably composed of a metal selected from the group consisting of Fe, Co, Sb, Bi, Pb, Ni, Ag, Si, Sn, Al, Zr, Cr, P, S, V, Mn, Nb, Mo, Cu, Zn, Ge, In, and Ti or a compound thereof, in view of the capacity and the cycle lifetime. Further, an alloy consisting of two or more metals may be used, or the metal particles may be alloy particles formed from two or more metal elements. Among these, a metal or a metal compound thereof selected from the group consisting of Si, Sn, As, Sb, Al, Zn, and W is preferable.

Examples of the metal compound include a metal oxide, a metal nitride, and a metal carbide. Also, an alloy consisting of two or more metals may be used.

Compounds in which these composite compounds are intricately bound to several types of elements of elemental metals, alloys, or non-metal elements are also included. Specifically, an alloy of an element such as silicon and tin and a metal that does not act as the negative electrode can be used. For example, in the case of tin, a complex compound containing 5 to 6 types of elements in combination of a metal other than tin and silicon that acts as the negative electrode, a metal that does not act as the negative electrode, and a non-metal element also can be used.

Among the metal particles that can be alloyed with Li, Si or a Si metal compound is preferable. The Si metal compound is preferably a Si metal oxide. Si or a Si metal compound is preferable for increasing the capacity. In this description, Si or a Si metal compound is generally refer to as a Si compound. Specific examples of the Si compound include SiOx, SiNx, SiCx, and SiZxOy (Z=C,N). The Si compound is preferably a Si metal oxide, and the Si metal oxide is represented by a formula SiOx. The formula SiOx is obtained by using silicon dioxide ($SiO_2$) and metal Si (Si) as raw materials, and the value of x is generally $0 \leq x < 2$. SiOx has a larger theoretical capacity than graphite, and amorphous Si or nano-sized Si crystals facilitates the entry and exit of alkali ions such as lithium ions, thereby enabling a high capacity to be obtained.

The Si metal oxide is specifically represented as SiOx, where x is $0 \leq x < 2$, more preferably 0.2 or more, and 1.8 or less, further preferably 0.4 or more and 1.6 or less, particularly preferably 0.6 or more and 1.4 or less, particular preferably X=0. Within such a range, the irreversible capacity due to the binding of Li and oxygen can be reduced while achieving a high capacity.

Further, a composite material containing the second and third constituent elements in addition to Si or Sn as a first constituent element can be mentioned. The second constituent element is, for example, at least one selected from cobalt, iron, magnesium, titanium, vanadium, chromium, manganese, nickel, copper, zinc, gallium, and zirconium. The third constituent element is, for example, at least one selected from boron, carbon, aluminum, and phosphorus.

The lithium-containing metal composite oxide material used as the negative electrode active material is not limited, as long as it is capable of absorbing/desorbing lithium, but a material containing titanium and lithium is preferable, a lithium-containing composite metal oxide material containing titanium is more preferable, and a composite oxide of lithium and titanium (hereinafter abbreviated as "lithium titanium composite oxide") is further preferable, in view of the charge/discharge characteristics at high-current density. That is, use of a lithium titanium composite oxide having a spinel structure contained in a negative electrode active material for batteries is particularly preferable since the output resistance is significantly reduced.

The lithium titanium composite oxide is preferably a compound represented by formula:

$$Li_xTi_yM_zO_4$$

wherein M represents at least one element selected from the group consisting of Na, K, Co, Al, Fe, Ti, Mg, Cr, Ga, Cu, Zn and Nb. Among the aforementioned compositional features, the structures of:

(i) $1.2 \leq x \leq 1.4$, $1.5 \leq y \leq 1.7$, z=0;
(ii) $0.9 \leq x \leq 1.1$, $1.9 \leq y \leq 2.1$, z=0; and
(iii) $0.7 \leq x \leq 0.9$, $2.1 \leq y \leq 2.3$, z=0 are particularly preferable, for balanced battery performance.

Particularly preferable representative compositional features of the aforementioned compounds are $Li_{4/3}Ti_{5/3}O_4$ in (i), $Li_1Ti_2O_4$ in (ii), and $Li_{4/5}Ti_{11/5}O_4$ in (iii). For the structure of Z≠0, preferable examples include $Li_{4/3}Ti_{4/3}Al_{1/3}O_4$.

The negative electrode preferably further comprises a binder, a thickener, and a conductive additive.

Examples of the binder include those similar to the binder that can be used for the positive electrode. The proportion of the binder with respect to the negative electrode active material is preferably 0.1 mass % or more, further preferably 0.5 mass % or more, particularly preferably 0.6 mass % or more, and preferably 20 mass % or less, more preferably 15 mass % or less, further preferably 10 mass % or less, particularly preferably 8 mass % or less. When the proportion of the binder with respect to the negative electrode active material exceeds such a range, the proportion of the binder that does not contribute to the battery capacity increases, which may lead to a decrease in the battery capacity. When the proportion falls below such a range, the strength of the negative electrode may decrease.

In particular, in the case of containing a rubbery polymer typified by SBR as a main component, the proportion of the binder with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less. Further, in the case of containing a fluorine-containing polymer typified by polyvinylidene fluoride as a main component, the proportion with respect to the negative electrode active material is generally 1 mass % or more, preferably 2 mass % or more, further preferably 3 mass % or more, and generally 15 mass % or less, preferably 10 mass % or less, further preferably 8 mass % or less. Further, in the case of containing a fluorine-free polymer typified by polyacrylic acid as a main component, the proportion with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less.

Examples of the thickener include those similar to the thickener that can be used for the positive electrode. The proportion of the thickener with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less. When the proportion of the thickener with respect to the negative electrode active material falls below such a range, the coating properties may significantly decrease. Meanwhile, when the proportion exceeds such a range, the proportion of the negative electrode active material in the negative electrode active material layer decreases, which may result in a decrease in battery capacity and an increase in the resistance between negative electrode active materials.

The conductive additive is not limited, as long as it can improve the electric conductivity of the electrolyte, but examples thereof include those similar to the thickener that can be used for the positive electrode.

Examples of the current collectors (the positive electrode current collector and the negative electrode current collector) include a metal foil or a metal mesh of iron, stainless steel, copper, aluminum, nickel, titanium, and the like. Among them, the positive electrode current collector is preferably an aluminum foil or the like, and the negative electrode current collector is preferably a copper foil or the like.

(Method for Producing Secondary Solid-State Battery)

The method for producing the secondary solid-state battery of the present disclosure is not limited, and it can be produced by a conventionally known method. Examples of the method for producing each electrode include dispersing and mixing each electrode active material in a solution or a dispersion of a binder dissolved or dispersed in a dispersion medium, to prepare an electrode mixture. The electrode mixture obtained is uniformly applied to a current collector such as a metal foil or a metal mesh, followed by drying and pressing, as required, to form a thin electrode mixture layer on the current collector as a thin film electrode.

Other than the above, the mixture may be produced, for example, by mixing the binder and the electrode active material first and then adding the dispersion medium. Further, it is also possible to produce an electrode sheet by heat-melting the binder and the electrode active material, extruding it with an extruder to produce a thin film mixture, and laminating it onto the current collector coated with an electrically conductive adhesive or a general-purpose organic solvent. Further, a solution or a dispersion of the binder may be applied to the electrode active material preformed in advance.

EXAMPLES

Hereinafter, the present disclosure will be specifically described based on the examples. In the following examples, "parts" and "%" respectively refer to "parts by mass" and "mass %", unless otherwise specified.

Preparation Example 1: Production of Fluorine-Containing Elastomer 1

1,650 ml of pure water was put into a 3-L stainless steel autoclave, the inside thereof was purged with nitrogen and slightly pressurized with hexafluoropropylene (HFP), and the temperature was adjusted to 80° C. under stirring at 380 rpm. HFP was injected up to 0.23 MPa, and further a mixed solution monomer with a molar ratio of vinylidene fluoride (VdF) to HFP of 78.2/21.8 was injected up to 1.472 MPa. 0.097 cc of 2-methyl butane was injected with nitrogen, 36.4 g of ammonium persulfate dissolved in 80 ml of pure water was injected with nitrogen to initiate polymerization. When the pressure dropped to 1.44 MPa, the pressure was increased to 1.50 MPa with a continuous monomer. Such operation was repeated for about 9.3 hours to put 607 g of the continuous monomer, and the gas inside the autoclave was released, followed by cooling, to collect 2,299 g of a dispersion. The solid content of the dispersion was 26.9 wt %. To this dispersion, was added magnesium chloride for coagulation, followed by drying, to obtain 610 g of a polymer. The polymer obtained contained HFP and VdF at a molar ratio of 22.1/77.9. The polymer obtained had a Mooney viscosity (ML1+10 (140° C.)) of 77 and a Tg, as determined by DSC, of −18° C. Further, no heat of fusion was observed in the second run.

Preparation Example 2: Production of Fluorine-Containing Elastomer 2

1,716 ml of pure water, 0.3432 g of a 50% aqueous solution of $CH_2=CFCF_2OCF(CF_3)CF_2OCF(CF_3)COONH_4$, and 3.421 g of a 50% aqueous solution of $C_5F_{11}COONH_4$ were put into a 3-L stainless steel autoclave, the inside thereof was purged with nitrogen and slightly pressurized with hexafluoropropylene (HFP), and the temperature was adjusted to 80° C. under stirring at 560 rpm. HFP was injected up to 0.56 MPa, VdF was injected up to 0.69 MPa, and further a mixed solution monomer with a molar ratio of VdF, TFE, and HFP of 70.2/11.4/18.3 was injected up to 2.000 MPa. 0.0218 g of ammonium persulfate dissolved in 4 ml of pure water was injected with nitrogen to initiate polymerization. When 12 g of a continuous monomer is reached, 2.5022 g of 1,4-diiodoperfluorobutane was added. When the pressure dropped to 1.97 MPa, the pressure was increased to 2.03 MPa with the continuous monomer. Such operation was repeated for about 5.0 hours to put 572 g of the continuous monomer, and the gas inside the autoclave was released, followed by cooling, to collect 2302 g of a dispersion. The solid content of the dispersion was 23.5 wt %. To this dispersion, was added aluminum sulfate for coagulation, followed by drying, to obtain 571 g of a polymer. The polymer obtained contained VdF, TFE, and HFP at a molar ratio of 69.9/11.6/18.5. The polymer obtained had a Mooney viscosity (ML1+10 (121° C.)) of 50 and a Tg, as determined by DSC, of –20° C. Further, no heat of fusion was observed in the second run.

Preparation Example 3: Production of Fluorine-Containing Elastomer 3

A polymer was obtained with the same procedures as in the fluorine-containing elastomer 2 while the material ratio was adjusted. The polymer obtained contained VdF, TFE, and HFP at a molar ratio of 77.2/6.2/16.6. The polymer obtained had a Mooney viscosity (ML1+10 (121° C.)) of 50 and a Tg, as determined by DSC, of –20° C. Further, no heat of fusion was observed in the second run.

Preparation Example 4: Fluorine-Containing Elastomer 4

44 L of pure water, 8.8 g of a 50% aqueous solution of $CH_2=CFCF_2OCF(CF_3)CF_2OCF(CF_3)COONH_4$, and 176 g of a 50% aqueous solution of $F(CF_2)$ $3COONH_4$ were put into an 82-L stainless steel autoclave, and the inside of the system was sufficiently purged with a nitrogen gas. Under stirring at 230 rpm, the temperature was raised to 80° C., then the monomers were injected so that the initial monomer composition in the tank was adjusted to VdF/TFE/HFP=19/11/70 mol %, and reached 1.52 MPa. Then, a polymerization initiator solution in which 1.0 g of APS (ammonium persulfate) was dissolved in 220 ml of pure water was injected with a nitrogen gas, to initiate a reaction. When the internal pressure dropped to 1.42 MPa with the progress of polymerization, a mixed monomer as an additional monomer with VdF/TFE/HFP=51/20/29 mol % was injected until the internal pressure was 1.52 MPa. At this time, 37 g of a diiodine compound I $(CF_2)_4I$ was injected. While repeating a pressure increase and decrease, an aqueous solution of 1.0 g of APS in 220 ml of pure water was injected with a nitrogen gas every 3 hours, to continue the polymerization reaction. When 14,000 g of the mixed monomer was added, unreacted monomers were released, and the autoclave was cooled, to obtain a fluoroelastomer dispersion with a solid content concentration of 22.5 mass %. The fluoroelastomer had a copolymer composition of VdF/TFE/HFP=50/20/30 (mol %) and a Mooney viscosity (ML1+10 (100° C.)) of 88. The Tg, as determined by DSC, was –7° C. Further, no heat of fusion was observed in the second run.

Preparation Example 5: Fluorine-Containing Elastomer 5

1,500 ml of pure water, 0.3001 g of a 50% aqueous solution of $CH_2=CFCF_2OCF(CF_3)CF_2OCF(CF_3)COONH_4$, and 6.001 g of a 50% aqueous solution of $C_5F_{11}COONH_4$ were put into a 3-L stainless steel autoclave, and the inside thereof was purged with nitrogen and slightly pressurized with vinylidene fluoride (VdF). The temperature was adjusted to 80° C. under stirring at 600 rpm, VdF was injected up to 1.22 MPa, and further a mixed solution monomer with a molar ratio of VdF and 2,3,3,3-tetrafluoropropene of 77.2/22.8 was injected up to 1.501 MPa. 0.1 g of ammonium persulfate dissolved in 4 ml of pure water was injected with nitrogen to initiate polymerization. When 11 g of a continuous monomer was reached, 1.6738 g of 1,1,1,2,3,3,3-heptafluoro-2-iodo-propane was added. When the pressure dropped to 1.44 MPa, the pressure was increased to 1.50 MPa with the continuous monomer. Such operation was repeated for about 6.2 hours to put 521 g of the continuous monomer, and the gas inside the autoclave was released, followed by cooling, to collect 2,087 g of a dispersion. The solid content of the dispersion was 26.08 wt %. To this dispersion, was added calcium chloride for coagulation, followed by drying, to obtain 524.3 g of a polymer. The polymer obtained contained 2,3,3,3-tetrafluoropropene and VdF at a molar ratio of 23.1/76.9. The polymer obtained had a Mooney viscosity (ML1+10 (140° C.)) of 60 and a Tg, as determined by DSC, of –14° C. Further, no heat of fusion was observed in the second run.

Preparation Example 6: Fluorine-Containing Elastomer 6

The composition ratio was adjusted with the same procedures as in Preparation Example 5, and 2,3,3,3-tetrafluoropropene and VdF were contained at a molar ratio of 39.9/60.1. The polymer obtained had a Mooney viscosity (ML1+10 (140° C.)) of 30 and a Tg, as determined by DSC, of –10° C. Further, no heat of fusion was observed in the second run.

A polyethylene oxide, available from Wako Pure Chemical Industries, Ltd., was used as a comparative example.

Examples 1 to 6 and Comparative Example 1: Production of Composite

For the fluorine-containing elastomers 1 to 6 obtained and a polyethylene oxide, 20 mass % of LiTFSI as an alkali metal salt and 60 mass % of BMI-TFSI as an ionic liquid were dissolved in dimethylformamide (DMF), to prepare polymer electrolyte solutions 1 to 7. The polymer electrolyte solutions were cast on a copper foil using an applicator and adjusted to a thickness of about 60 μm after drying. The cast polymer electrolyte solutions were dried at 100° C. under reduced pressure for 24 hours, to produce composite films 1 to 7.

(Measurement of Volatile Content)

The composite films produced as described above were further heated at 100° C. under reduced pressure for 48 hours, to calculate the volatile content from the change in mass before and after drying.

(Flammability Test)

The composite films produced were exposed to a naked flame of a lighter for 3 seconds, and the ease of flame transfer and flammability were visually observed. If there was no flame transfer, it was determined to be flame retardant.

(Measurement of Ion Conductivity)

As samples for this measurement, composites similar to those in Examples 1 to 6 were used. Each composite film was punched into a diameter of 13 mm, and stainless steel was used as the working and counter electrodes, to create a bipolar cell. The battery created was connected to a complex AC impedance measuring device using a flow line in a constant-temperature oven set at 60° C., followed by standing for 3 hours in order to allow the electrolyte and the electrodes to be sufficiently blended. Then, measurement was performed, to calculate the ion conductivity from the following formula.

$$\sigma = C/R (C = l/S)$$

Here, l represents the thickness of a sample, S represents its area, and R represents its resistance. From the results of Table 3, it turned out that the composite films of Examples 1 to 6 exhibited sufficient ion conductivity as electrolytes for polymer-based solid-state batteries.

(Evaluation of Oxidation Resistance)

Figure 1:
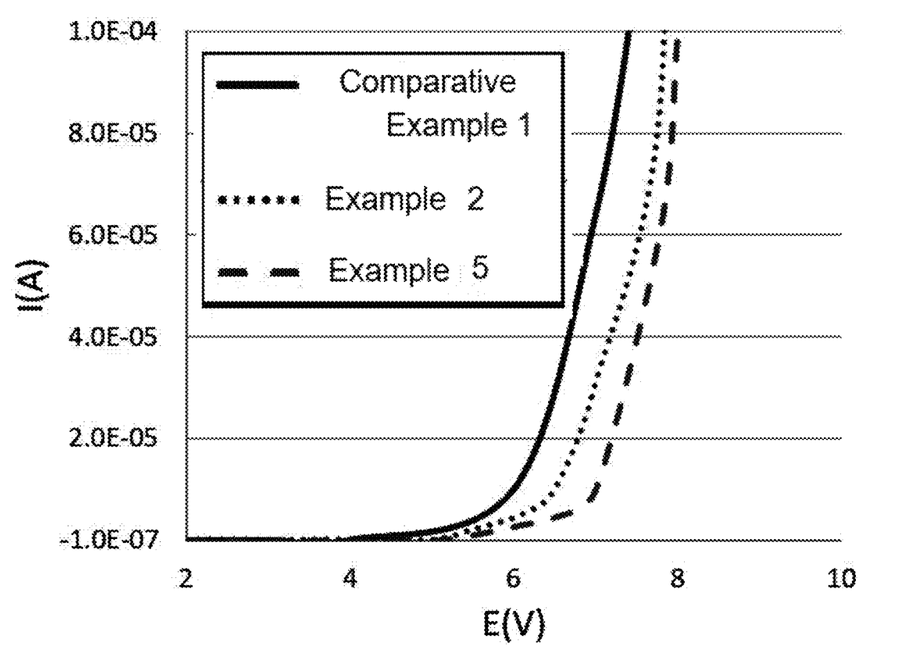
The Figure shows the data of the oxidation resistance test for Examples 2, 5 and Comparative Example 1.

The oxidation resistance of the composite films was evaluated by the LSV (Linear Sweep Voltammetry) method. For the LSV measurement, propylene carbonate was used as a solvent, and the solvent containing 3 mass % of LiTFSI was used. Two preparations were made by adding 1 mass % of each of the aforementioned polymers (Example 2, 5 or Comparative Example 1) to the solution. Each measurement solution prepared in advance was put into a measurement container, and a platinum electrode as a working electrode and those immersed with lithium metal as a counter electrode and a reference electrode were used to form a LSV measurement cell. Then, measurement was performed by sweeping the potential from OCV (open circuit voltage) to 8 V (vs. Li+/Li) on the oxidation side at a sweep rate of 5 mV/s. The Figure shows the results. Examples 2 and 5 were shown to have high oxidation resistance.

TABLE 1

|  | Composition ratio |
| --- | --- |
| Fluorine-containing elastomer 1 | VdF:HFP = 78:22 |
| Fluorine-containing elastomer 2 | VdF:TFE:HFP = 70:12:18 |
| Fluorine-containing elastomer 3 | VdF:TFE:HFP = 77:6:17 |
| Fluorine-containing elastomer 4 | VdF:TFE:HFP = 50:20:30 |
| Fluorine-containing elastomer 5 | VdF:TFP = 77:23 |
| Fluorine-containing elastomer 6 | VdF:TFP = 60:40 |
| Comparative Example | Polyethylene oxide |

TABLE 2

|  | Fluorine-containing elastomer | Volatile content (mass %) |
| --- | --- | --- |
| Example 1 | Fluorine-containing elastomer 1 | <0.01 |
| Example 2 | Fluorine-containing elastomer 2 | <0.01 |
| Example 3 | Fluorine-containing elastomer 3 | <0.01 |
| Example 4 | Fluorine-containing elastomer 4 | <0.01 |
| Example 5 | Fluorine-containing elastomer 5 | <0.01 |
| Example 6 | Fluorine-containing elastomer 6 | <0.01 |
| Comparative Example 1 | Polyethylene oxide | <0.01 |

TABLE 3

|  | Electrolyte | Ion conductivity (S/cm) |
| --- | --- | --- |
| Example 1 | Fluorine-containing elastomer 1 | $3.5 \times 10^{-7}$ |
| Example 2 | Fluorine-containing elastomer 2 | $2.7 \times 10^{-8}$ |
| Example 3 | Fluorine-containing elastomer 3 | $2.0 \times 10^{-8}$ |
| Example 4 | Fluorine-containing elastomer 4 | $8.3 \times 10^{-8}$ |
| Example 5 | Fluorine-containing elastomer 5 | $9.9 \times 10^{-7}$ |
| Example 6 | Fluorine-containing elastomer 6 | $4.9 \times 10^{-7}$ |

TABLE 4

|  | Electrolyte | Flame retardancy |
| --- | --- | --- |
| Example 1 | Fluorine-containing elastomer 1 | ○ |
| Example 2 | Fluorine-containing elastomer 2 | ○ |
| Example 3 | Fluorine-containing elastomer 3 | ○ |
| Example 4 | Fluorine-containing elastomer 4 | ○ |
| Example 5 | Fluorine-containing elastomer 5 | ○ |
| Example 6 | Fluorine-containing elastomer 6 | ○ |
| Comparative Example 1 | Polyethylene oxide | x |

(Production of Lithium Ion Secondary Battery)

[Production of Positive Electrode]

95 mass % of $LiNi_{0.5}Co_{0.2}Mn_{0.3}O_2$ (NMC) as a positive electrode active material, 3 mass % of acetylene black as a conductive material, and 2 mass % of polyvinylidene fluoride (PVdF) as a binder were mixed in an N-methylpyrrolidone solvent to form a slurry. The slurry obtained was applied onto one side of an aluminum foil having a thickness of 15 μm to which a conductive additive was applied in advance, dried, and roll-pressed with a press machine. The resultant was cut out to form a positive electrode 1. A positive electrode 2 was produced in the same manner as above except that $LiMn_{1.5}Ni_{0.5}O_4$ (LNMO) as a positive electrode active material was used.

[Production of Negative Electrode]

To 98 parts by mass of a carbonaceous material (graphite), there were added 1 part by mass of an aqueous dispersion of sodium carboxymethylcellulose (concentration of sodium carboxymethylcellulose: 1 mass %) and 1 part by mass of an aqueous dispersion of styrene-butadiene elastomer (concentration of styrene-butadiene elastomer: 50 mass %) as a thickener and a binder, followed by mixing with a disperser, to form a slurry. The slurry obtained was applied onto a copper foil having a thickness of 10 μm, dried, and rolled with a press machine. The resultant was cut out to form a negative electrode.

[Production of Aluminum Laminate Cell]

The positive electrode, the composite film 1, and the negative electrode were opposed and rolled with a roll press machine, to enhance the adhesion.

Thereafter, it was punched, attached with an electrode tab, sealed, precharged, and then aged, to produce a lithium ion secondary battery 1 having a design capacity of 1 Ah. A lithium ion secondary battery 2 was produced in the same manner as above except that a positive electrode 2 was used.

[Evaluation of Initial Discharge Capacity]

While the secondary battery 1 produced above was interposed between plates to be pressurized, the battery was charged at a constant current and a constant voltage to 4.2 V at 25° C. with a current corresponding to 0.1 C. While the secondary battery 2 produced above was interposed between plates to be pressurized, the battery was charged at a constant current and a constant voltage to 4.8 V at 25° C. with a current corresponding to 0.1 C.

(Nail Penetration Test)

The lithium ion secondary batteries 1 and 2 produced were fixed to a horizontal table in an atmosphere of 25° C., and a ceramic nail having a diameter of 3 mm was inserted from above the battery toward the center of the battery at a nail penetration speed of 80 mm/s for the nail penetration test. Then, the state was observed, and the temperature was measured.

In the battery produced using the composite film 1, no fuming, explosion, or ignition was observed, and the temperature change on the surface of the battery was within 5° C.

From the above, it was confirmed to be a battery with high safety.

INDUSTRIAL APPLICABILITY

The composite of the present disclosure can be suitably used as an electrolyte for polymer-based solid-state batter-

The invention claimed is:

1. A polymer electrolyte consisting of a composite comprising a fluorine-containing elastomer and an alkali metal salt as essential components, wherein
the fluorine-containing elastomer is at least one amorphous fluorine-containing elastomer having a glass transition temperature of 25° C. or less and selected from the group consisting of vinylidene fluoride-based fluoroelastomer, tetrafluoroethylene/propylene-based fluoroelastomer, and tetrafluoroethylene/perfluoroalkyl vinyl ether-based fluoroelastomer,
the vinylidene fluoride-based fluoroelastomer is at least one copolymer selected from the group consisting of a VdF/HFP copolymer, a VdF/TFE/HFP copolymer, a VdF/TFE/PAVE copolymer, a VdF/HFP/PAVE copolymer, a VdF/HFP/TFE/PAVE copolymer, a VdF/TFP/Pr copolymer, a VdF/Et/HFP copolymer, a VdF/Et/HFP/TFE/PAVE copolymer, a VdF/TFP/TFE copolymer, and a VdF/TFP copolymer,
the VdF/HFP copolymer has a VdF/HFP composition of (60 to 80)/(40 to 20) (mol %), and
the composite has a volatile content of 0.1 mass % or less with respect to the entire composite.

2. The polymer electrolyte according to claim 1, wherein
the alkali metal salt is at least one lithium salt selected from $LiPF_6$, $LiBF_4$, LiTFSI, LiFSI, $LiPO_2F_2$, and LiBOB, and
a content of the alkali metal salt is 0.1 to 90 mass % with respect to the fluorine-containing elastomer.

3. The polymer electrolyte according to claim 1, further comprising:
at least one ionic liquid selected from combinations of a 1-butyl-3-methyl imidazolium (BMI) cation or an N-methyl-N-butyl-pyrrolidium (Pyr14) cation as an organic cation and $BF_4$ anion or bis(trifluoromethanesulfonyl)imide (TFSI) anion as an anion, wherein
a content of the ionic liquid is 1.0 to 500 mass % with respect to the fluorine-containing elastomer.

4. The polymer electrolyte according to claim 1, wherein the fluorine-containing elastomer is vinylidene fluoride-based fluoroelastomer.

5. The polymer electrolyte according to claim 4, wherein the fluorine-containing elastomer comprises at least one selected from the group consisting of a tetrafluoroethylene (TFE) unit, a hexafluoropropylene (HFP) unit, a fluorine-containing monomer (1) unit represented by formula (1) below, and a fluorine-containing monomer (2) unit represented by formula (2) below, as a copolymer component:

wherein $Rf_1$ represents a linear or branched fluoroalkyl group having 1 to 12 carbon atoms, and $Rf_2$ represents a linear or branched fluoroalkyl group having 1 to 12 carbon atoms.

6. An electrochemical device comprising the polymer electrolyte according to claim 1.

7. An actuator comprising the polymer electrolyte according to claim 1, wherein the actuator is selected from the group consisting of cylinders, swing motors, and motors.

8. A polymer-based solid-state battery comprising the polymer electrolyte according to claim 1.

9. The polymer-based solid-state battery according to claim 8, wherein the battery is a lithium ion secondary battery.